UNITED STATES PATENT OFFICE.

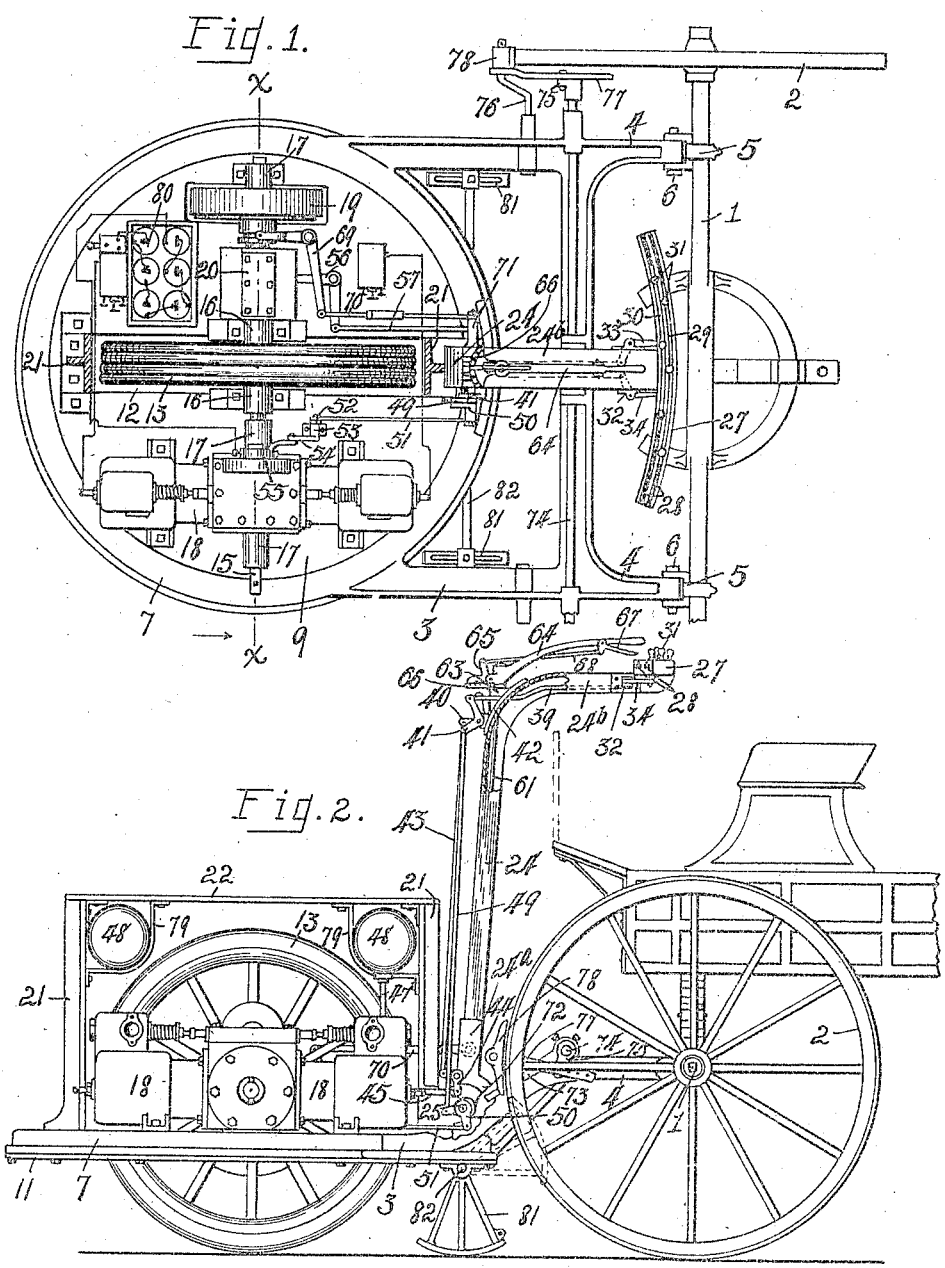

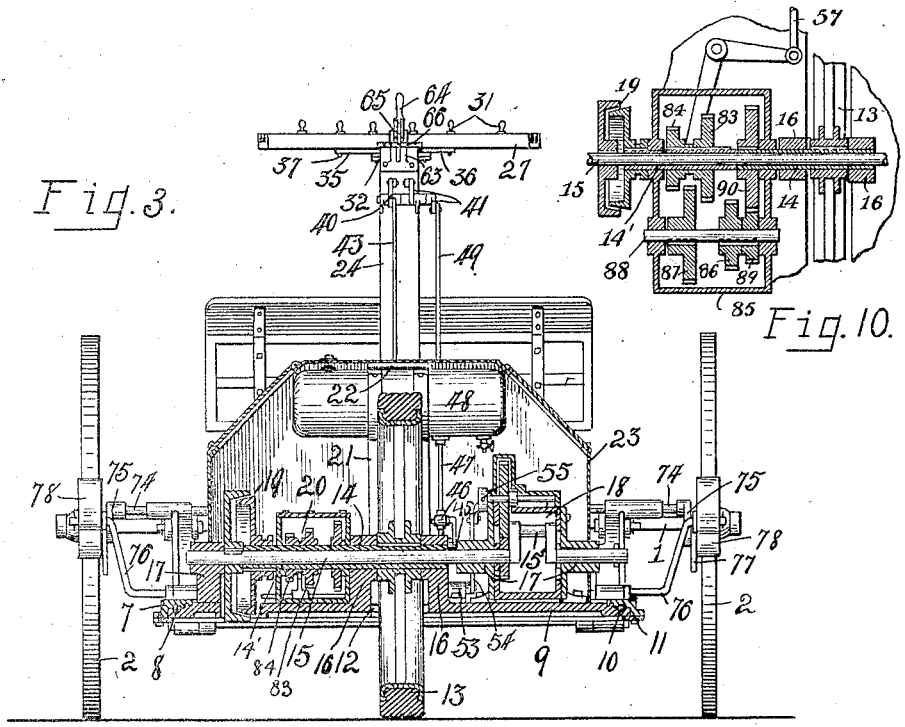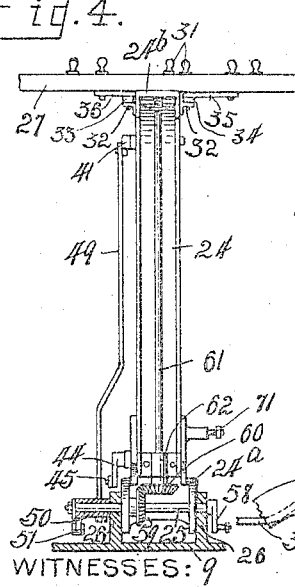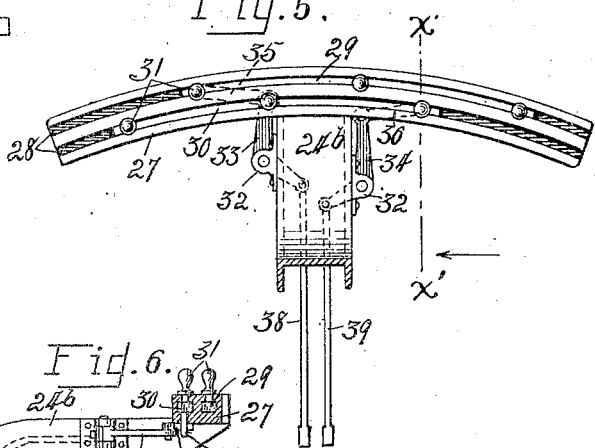

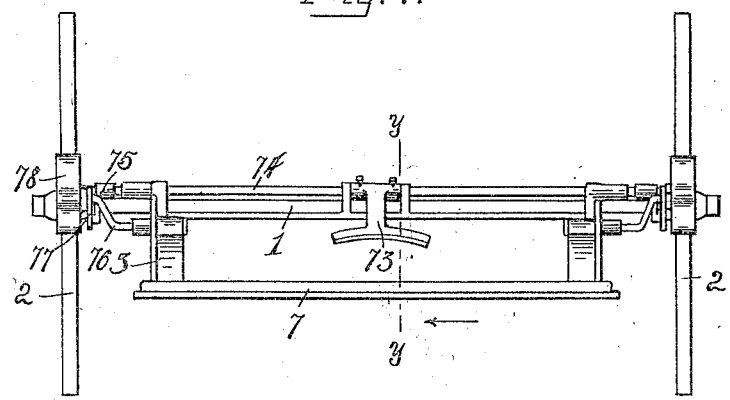
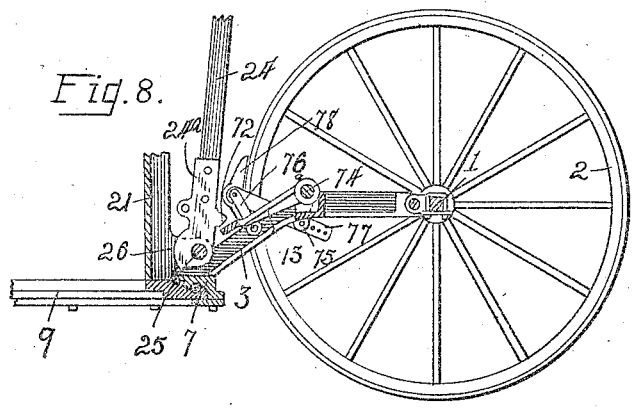
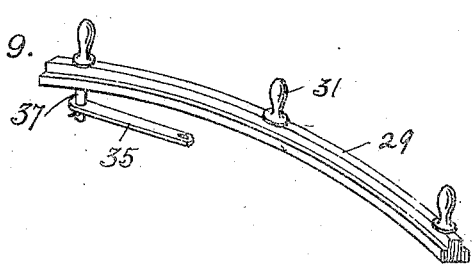

JOHN D. R. LAMSON, OF TOLEDO, OHIO.

VEHICLE-TRACTOR.

1,002,997.

Specification of Letters Patent. Patented Sept. 12, 1911.

Application filed December 20, 1909. Serial No. 534,211.

*To all whom it may concern:*

Be it known that I, JOHN D. R. LAMSON, a citizen of the United States, and a resident of Toledo, in the county of Lucas and State of Ohio, have invented a certain new and useful Vehicle-Tractor; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to power means adapted to be attached to any vehicle to propel the same, and particularly to improvements upon the structure described and claimed in U. S. Letters Patent No. 852,884, granted to me on May 7, 1907.

The object of my invention is the provision of a simple, improved and highly efficient apparatus of this character, which is strong, durable and economical in its construction, and capable of being easily and quickly attached to or detached from a vehicle which it is intended to propel.

Further objects of my invention as well as the operation, construction and arrangement of the parts thereof will be apparent by reference to the following description.

While my invention in its broader aspect is susceptible of embodiment in numerous forms, a preferred form of the same is illustrated in the accompanying drawings, in which,—

Figure 1 is a plan view of a preferred form of the invention attached to a vehicle with the casing removed and portions of the supporting frame therefor in section. Fig. 2 is a side elevation thereof with the casing removed and different portions broken away. Fig. 3 is a transverse section of the same on the line *x x* in Fig. 1. Fig. 4 is a rear detail view of the controlling mechanism. Figs. 5 and 6 are top, plan and side views of the handle portion of such mechanism with the latter in section on the line *x' x'* in Fig. 5. Fig. 7 is a front view of a portion of the frame attached to a vehicle together with a part of the brake mechanism. Fig. 8 is a section of the same on the line *y y* in Fig. 7, with the portion of the controller handle in position. Fig. 9 is a perspective view of one of the sliding parts of the controller-handle and Fig. 10 is a horizontal section of a simple form of transmission mechanism.

Referring to the drawings, 1 designates the front pivoted axle of a vehicle of any suitable form or style, 2 the front wheels thereof, and 3 the draft frame of the tractor comprising my invention.

The frame 3 is provided at its rear end with arms 4, which are suitably spaced and constructed to adapt them to be pivotally attached to the customary thill or pole coupling parts 5 on the axle 1 by means of bolts or pins 6. The forward portion of the frame 3 is formed with a circular opening or is in the shape of a ring 7 having a ball-groove or race 8 on its under side. A turn-table 9 is fitted within the ring 7 and has its marginal portion provided with a ball groove or race carrying balls 10 on which the groove 8 of the ring 7 rests, as indicated in Fig. 3. The ring 7 has a flange or ring 11 removably secured to its under side and projecting inwardly under the outer edge of the turntable to retain the ring 7 and table together.

In the center of the turn-table is a slot or opening 12 for the traction-wheel 13 of the apparatus. This wheel is secured upon a sleeve 14 on the engine or drive-shaft 15 which sleeve and shaft are mounted in inner bearings 16 rising from the table 9 at opposite sides of the slot 12, and the shaft has its ends journaled in the bearings 17 rising from or secured to the table without the bearings 16.

18 designates the motor which is carried by the table 9 and is shown in the present instance as comprising an internal combustion engine of the horizontal double opposed cylinder type the piston rods of which are attached to a crank 15' of the shaft 15.

19 designates a clutch, one member of which is fixed to the shaft 15 while the other member thereof is feathered to a sleeve 14 on said shaft, and 20 is any suitable form of variable transmission, said clutch and transmission mechanism being adapted to work together in any desired or well known manner to permit the sleeve 14 to run loose on the shaft or to communicate different speeds to the sleeve from a rotation of the shaft, as is well understood in the art.

Rising from the turn-table 9 adjacent its front and rear edges are standards or uprights 21, 21, which are connected at their upper ends by a cross-piece 22, and coöperate with the table and cross-piece to support a case or housing 23 having suitable doors or lid-closed openings to permit easy access to the incased parts.

A vertical steering arm or upright 24 is disposed at the rear of the case or housing 23 and has its lower end loosely mounted on a shaft 25 for forward and rearward oscillatory movement, said shaft being journaled in spaced bosses 26 on the rear portion of the turn-table 9, see Figs. 2 and 4. The arm 24 is shown in the present instance as being of channel form and provided at its foot with a casting 24ª, which is the part that is journaled on the shaft 25, and as having its upper end angled rearwardly, as indicated at 24ᵇ. Secured to the rear or free end of said arm part 24ᵇ is a cross-bar or handle 27, which is of segmental form and provided on its top surface with two concentric grooves or guide-ways 28. Segmental bars or members 29 and 30 are mounted in the inner broadened portions of these grooves or ways for longitudinal reciprocatory movements therein. The bars 29 and 30 are each provided with one or more studs 31, which project outwardly therefrom through the grooves and serve as handles to facilitate a moving of the bars, as is apparent.

Fulcrumed to brackets 32 on opposite sides of the part 24ᵇ of the arm 24 are the bell-crank levers 33 and 34, the former of which has one arm connected by a link 35 to the bar 29, while the latter has one of its arms connected to the bar 30 by a link 36, as best shown in Fig. 5. Each of the links 35 and 36 attaches at its outer end to a pin 37 projecting from the bottom of the respective bars through a registering slot in the handle 27. The other arms of the levers 33, 34 project inwardly through the sides of the arm 24 and respectively attach to rods 38, 39, which in turn extend forwardly through the upper end of the upright portion of the arm 24 and attach at their outer ends to the upwardly disposed arms of the bell-crank levers 40 and 41, respectively. These levers are fulcrumed to a bracket 42 secured to the arm 24. The lever 40 has its forwardly projecting arm connected by a rod 43 to the forwardly projecting arm of a bell-crank lever 44, while the other or downwardly projecting arm of such lever, which is laterally spaced from the first arm, is connected by a rod 45 to the arm of a gasolene or other fuel supply valve 46 disposed in a pipe 47 leading from a supply-tank 48 to the engine cylinders, thus providing control means for the fuel supply. The forwardly projecting arm of the lever 41 is connected by a rod 49 to the horizontally projecting arm of a bell-crank lever 50, loosely mounted on a projected end of the shaft 25, while the other arm of such lever is connected by a rod 51 to an upwardly projecting arm 52 (Fig. 1), the shaft of which is journaled in a bearing 53 on the table 9 and has an upwardly-projecting arm 54 attached to the spark-controlling or timing mechanism 55 of the engine (see Figs. 1 and 3). It is thus apparent that a movement of the bar 30 in the handle groove will effect a movement of such timing mechanism to advance or retard the spark as desired.

56 designates the shifting bell-crank lever of the transmission 20, which lever is fulcrumed to a vertical stud carried by the table 9 (see Fig. 1). A rod 57 connects the free arm of the lever 56 to a vertically-disposed arm 58 which is fixed to an end of the shaft 25 (see Fig. 4). A bevel-gear 59 is fixed to the shaft 25 intermediate the bearing portions of the casting 24ª of the arm 24, and meshing therewith is a companion bevel-gear 60, carried at the lower end of a vertical shaft 61. This shaft is disposed within the channel of the arm 24 and has its lower end journaled in a bearing 62 within such channel and its upper end projected through a bearing 63 in the angled end of the arm (see Figs. 2 and 3). A controller-arm 64 is fixed to the upper end of the shaft 61 and extends rearwardly therefrom over the part 24ᵇ of the arm 24. A pawl 65 is carried at the forward end of the arm 64 and is adapted to engage with a notched segment 66 to retain the controller-arm in any position to which it may be thrown. The movements of this pawl are controlled by a hand-lever 67 carried by the arm 64 and a connecting rod 68. It will thus be seen that a shifting of the controller-arm 64 in one direction or the other will communicate a rocking movement to the bell-crank lever 56 to shift the change gear of the transmission.

The shifting lever 69 of the clutch 19, which lever is of the bell-crank type, is fulcrumed to a stud rising from the table 9 and has one end in forked engagement with the sleeve or hub portion of the movable clutch member and its other end connected by a rod 70 to a stud 71 projecting from the adjacent side of the steering arm 24 above its fulcrum, whereby an oscillation of such arm on its fulcrum will effect a shifting of the movable clutch member into or out of engagement with its companion.

The rear portion of the foot 24ª of the steering-arm 24 is formed with a lug 72, which on a rearward oscillatory movement of the arm is intended to engage and rock an arm 73 projecting forward from a rock-shaft 74. This shaft is journaled in suitable bearings transversely of the rear portion of the frame 3 and has arms 75 projecting inwardly therefrom adjacent its ends. Journaled in opposite side portions of the frame 3 in advance of the shaft 74 are the crank-shafts 76, 76, each of which has its cranked end connected with the associated arm 75 by a link 77, which is shown in Fig. 8 as being adjustably connected to the arm 75. The crank-end of each shaft 76 also carries a brake-shoe 78 in position to engage the periphery of the associated front wheel 2 of the attached vehicle when the shaft 74 is rocked by a depression of the arm 73. The outer end of the arm 73 is in segment form, as shown in Fig. 7, to enable the lug 72 to engage such arm within a predetermined range of turning movement of the table 9 and attached arm 24.

The tractor is shown in the present instance as being equipped with two fuel tanks 48, the same being supported by straps 79 adjacent the upper inner sides of the table standards 21.

80 designates the batteries for the sparking circuit.

In order to hold the tractor in upright position when being attached to or detached from a vehicle it is provided at opposite sides thereof to the rear of the traction wheel 13 with supporting legs or standards 81, 82. These legs or standards are carried by a shaft 82, which is journaled in the frame 3 transversely thereof and adapted to be rocked to effect a raising of the legs to inoperative position or a lowering of the same to operative position, as shown in Fig. 2.

While it is apparent that any suitable form of transmission mechanism 20 can be used, the one illustrated, which is shown in Fig. 10, comprises large and small gears 83 and 84 feathered on the sleeve 14' within the case 85, which gears may be shifted by movements of the lever 56 to selectively place them respectively in mesh with the gears 86 and 87 keyed to a shaft 88 journaled in the case 85. Rotation is communicated from the shaft 88 to the sleeve 14 through the meshing gears 89 and 90. The operation of this mechanism is apparent. In the use of this form of my invention, the same is attached to the front axle 1 of a vehicle which it is intended to draw by securing the arms 4 of the frame 3 to the thill or pole coupling parts 5 of such axle, the legs 81 being lowered to support the tractor frame against tilting movements during such attaching operation. After starting the engine the operator is able to control the movements of the tractor from the seat on the attached vehicle, due to the upper angled end of the steering-arm 24, which carries the controlling parts, projecting in convenient position for such purpose. To regulate the spark-timing mechanism 55 to advance or retard the spark it is only necessary for the operator to move the controlling bar 30 in one direction or the other in the handle-groove 28, which communicates the requisite movement to the time mechanism through the medium of the link 36, bell-crank lever 34, rod 39, lever 41, rod 49, lever 50, rod 51, arms 52 and 54 and the shaft on which said arms are mounted. The supply of fuel to the engine cylinders is controlled by a reciprocatory movement of the controller-bar 29 in the desired direction on the handle 27, which communicates either an opening or a throttling movement to the fuel valve 46 through the medium of the link 35, bell-crank lever 33, rod 38, lever 40, rod 43, lever 44, and rod 45. To shift the sliding element of the transmission 20 it is only necessary for the operator to swing the controller-arm 64 in one direction or the other, which effects a rocking of the bell-crank shifting lever 56 through the medium of the rod 57, arm 58, shaft 25, bevel-gears 59, 60 and shaft 61. To throw the clutch parts 19 into engagement the operator moves the steering-arm 24 forward on its fulcrum, thus imparting a forward thrust to the attached rod 70 and rocking the shifting-lever 69 in a direction to move the members of the clutch together. The steering of the tractor is effected by swinging the handle in one direction or the other, which turns the table 9 and attached tractor wheel 13 within the ring 7. To stop the vehicle the operator swings the arm 24 to the rear on its pivot 25, which movement actuates the rod 70 and shifting-lever 69 to release the engagement of the clutch parts, and also effects a clamping of the brake-shoes 78 on the front vehicle wheels, due to the lug 72 on the lower end of the arm 24 striking and depressing the arm 73. This movement of the arm 73 rocks the shaft 74 and attached arms 75 and communicates clamping movements to the shoes through the links 77 and crank-shafts 76.

It is thus apparent that I have provided simple, compact and efficient means for steering and controlling the operative parts of the tractor, whereby to render a machine of this class easy and simple of operation and practical for commercial use.

I wish it understood that my invention is not limited to the specific arrangement or construction of the parts, except in so far as such limitations are specified in the claims.

Having thus described my invention, what I claim as new and desire to secure by Letters Patent, is,—

1. In a vehicle tractor, a frame capable of attachment to a vehicle, a tractor mechanism rotatable in and supporting said frame and having a control part, brake means carried by the frame and adapted to operate on the wheels of an attached vehicle, and a member carried by said mechanism and having connection with said control part, said member being movable in one direction to move said control part and in the other direction to both move said control part and actuate the brake means, to engage the associated wheels.

2. In a vehicle tractor, a frame capable of attachment to a vehicle, a tractor mechanism supporting said frame and having a clutch part, brake means carried by said frame and operative to engage the wheels of an attached vehicle, and an oscillatory steering arm having connection with said clutch and movable in one direction to effect an engagement of the clutch and in the opposite direction to effect a release of the clutch and an engagement of the brake means.

3. In a vehicle tractor, a frame capable of attachment to a vehicle, a tractor mechanism supporting said frame, said mechanism being mounted for rotary steering movements relative to said frame and having a control clutch, brake means carried by said frame and operative to engage the wheels of an attached vehicle, and a member pivoted to said mechanism and movable therewith to impart steering movements thereto and movable in one direction on its pivot to effect an engagement of the clutch and in the opposite direction to effect a release of the clutch and an engagement of the brake means.

4. In a vehicle tractor, a frame capable of attachment to a vehicle, tractor mechanism rotatable in and supporting said frame, said mechanism having a variable transmission and a control clutch, a pivotal arm associated with such mechanism and having connection with said clutch whereby an oscillation of the arm effects an engagement or release of such clutch, and means carried by said arm in connection with said transmission and movable to control such transmission.

5. In a vehicle tractor, a frame capable of attachment to a vehicle, tractor mechanism supporting said frame and having a variable transmission and a clutch associated therewith, brake means operative to engage the wheels of an attached vehicle, a pivoted member having connection with said clutch and movable in one direction on its pivot to effect an engagement of the clutch and in the other direction to effect a release of the clutch and an engagement of said brake means, and control means associated with said member and having connection with said transmission to control the same.

6. In a vehicle tractor, a frame capable of attachment to a vehicle, a tractor mechanism supporting said frame and capable of rotary steering movements relative thereto, said mechanism having a variable transmission and a control clutch, brake means operative to engage the wheels of an attached vehicle, a member attached to said mechanism and having connection with the clutch, said member being movable to impart steering movements to such mechanism and movable at an angle to such steering movements to release or engage the clutch and to operate the brake means to engage the wheels or permit a release of the same, and means associated with said member and in connection with the transmission to control the same.

7. In a vehicle tractor, a frame capable of attachment to a vehicle, a tractor mechanism supporting said frame and capable of rotary steering movements relative thereto, said mechanism having a clutch control, an internal combustion engine and a spark timing device for such engine, a steering arm pivotally attached to said mechanism and having connection with the clutch, said arm being movable with the mechanism to impart steering movements thereto and being pivotally movable relative to said mechanism to impart movements to said clutch mechanism, and control means for the spark timer carried by said arm.

8. In a vehicle tractor, a frame capable of attachment to a vehicle, a tractor mechanism supporting said frame and capable of rotary steering movements relative thereto and having spark timing and fuel control parts, a steering arm attached to said mechanism and movable to impart steering movements thereto, a segmental bar carried by said arm, a plurality of control members guided for sliding movements by said bar and having connection with different of said parts to control the movements of the same.

9. In a vehicle tractor, a frame capable of attachment to a vehicle, a tractor mechanism supporting said frame and capable of rotary steering movements relative thereto, said mechanism having a control clutch and spark timing and fuel controlling parts, a steering arm attached to said mechanism and having connection with said clutch, said arm being movable with said mechanism to impart steering movements thereto and being movable relative to such mechanism to effect an engagement or release of the clutch, and separate means carried by said arm and in connection with said spark timing and fuel control parts to control the same.

10. In a vehicle tractor, a frame capable of attachment to a vehicle, a tractor mechanism supporting said frame and capable of steering movements relative thereto, said mechanism having a clutch, an engine, and spark timing and fuel control parts for such engine, a steering arm attached to said mechanism and having connection with said clutch, said arm being movable with said mechanism to impart steering movements thereto and being movable relative to said mechanism to release or engage the clutch, a guide-bar carried by said arm, a plurality of members guided by said bar for sliding movements relative thereto, and connections between said members and said spark timing and fuel control parts to control the movements of the same.

11. In a vehicle tractor, a frame capable of attachment to a vehicle, a tractor mechanism supporting said frame and capable of steering movements relative thereto, said mechanism having a clutch, a variable transmission, an engine, and spark timing and fuel control parts for such engine, brake means for engaging the wheels of an attached vehicle, a steering arm attached to said mechanism and having connection with said clutch, said arm being movable with said mechanism to impart steering movements thereto and being movable relative to such mechanism to effect a release or engagement of the clutch and to effect an engagement of the brake means or to permit a release thereof, means carried by said arm in connection with said transmission for controlling the same, and separate means carried by said arm in connection with said spark timing and fuel control parts to control the movements of the same.

12. In a motor vehicle, the combination with the tractor mechanism, of a steering arm having a transverse bar at its upper end, said bar having guide slots therein, and a control member mounted in each of said guide slots for reciprocatory movements relative to the bar and having connection with a control part of said mechanism.

13. In a motor vehicle, the combination with the tractor mechanism, of a steering arm attached thereto and having a segmental cross bar at its upper end, such bar having segmental slots therein, and a control member mounted in each of such slots for reciprocatory movements relative to the bar and having connection with a part of said mechanism.

In testimony whereof, I have hereunto signed my name to this specification in the presence of two subscribing witnesses.

JOHN D. R. LAMSON.

Witnesses:
C. W. OWEN,
E. E. THOMAS.